United States Patent Office 3,305,605
Patented Feb. 21, 1967

3,305,605
COMPOSITIONS CONTAINING POLYCARBONATE PLASTICIZERS
Fritz Hostettler and Eugene F. Cox, Charleston, W. Va., assignors to Union Carbide Corporation, a corporation of New York
No Drawing. Filed Feb. 4, 1964, Ser. No. 342,545
15 Claims. (Cl. 260—873)

This invention relates to plasticized compositions.

A major shortcoming of externally-plasticized, flexible resin compositions, e.g., poly(vinyl halide), is the tendency of the plasticizer to escape from the plasticized composition by volatilization or by extraction processes. These tendencies become aggravated or more pronounced at elevated temperatures such as in fields of applications in which the plasticized composition is used, for example, as an insulating medium for wire and cable. Contact with various liquid media, e.g., water, oil, fats, etc., also can result in the extraction or loss of the plasticizer in the plasticized composition. Loss of the plasticizer eventually can cause undesirable stiffening of the plasticized composition which ultimately leads to failure by cracking, excessive stiffening, shrinkage, and the like.

The instant invention encompasses the preparation of novel plasticized resins, in particular, the preparation of plasticized vinyl resins, using various solid polycarbonate polymers described hereinafter as the plasticizing agents therefor. In general, the aforesaid polycarbonates exhibit a combination of highly desirable properties. Many of the novel plasticizeed compositions exhibit superior and outstanding low temperature performance, and an unexpectedly high degree of permanence. Excellent flexibility at temperatures below 0° C., and extraordinary brittle temperatures far below 0° C. also are characteristics of the novel plasticized compositions. In addition, these novel plasticized compositions exhibit low volatility, extremely high resistance to oil and/or water extraction, excellent color and processability, and superior resistance to straining.

The plasticizers which are contemplated are high molecular weight solid polymers of various cyclic carbonates, said polymers containing a plurality of carbonate groups, i.e.,

in the substantially linear polymeric chain thereof. The average molecular weights of these solid polymers can range from about 15,000 to the low millions, e.g., from about 15,000 to about 1,000,000, and higher. Preferably, these polymers which are useful as plasticizing agents have an average molecular weight of at least about 20,000, and preferably still at least about 25,000. It it pointed out at this time that the terms "polymer(s)" or "polymeric," as used herein including the appended claims, refers to the reaction products resulting from the polymerization or interaction of one or more polymerizable monomers. In this respect, the term "polymer" is employed in its generic sense. It is also pointed out that the term "copolymer," as used herein including the appended claims, refers to the reaction products resulting from the polymerization or interaction of two or more polymerizable monomers.

In one aspect, the aforesaid polymers are characterized by the recurring unit:

I 

wherein $R_1$ represents a divalent aliphatic chain which contains at least 3 carbon atoms, and preferably 3 carbon atoms, and which is free from ethylenic and acetylenic unsaturation, said $R_1$ being monovalently bonded to both oxy atoms (—O—) in the above structural unit through carbon atoms, and further said $R_1$ containing no more than 4 substituents along the aliphatic chain. The homopolymers as well as the copolymers which contain halo, nitro, cyanoalkyl, cyanoalkoxymethyl, haloalkyl, and/or tertiary amino groups in a recurring unit are preferred.

In another aspect, the substantially linear polycarbonates are characterized by the recurring unit:

II 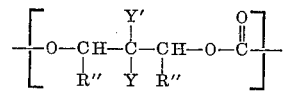

wherein $R''$ is hydrogen or alkyl which preferably contains from 1 to 6 carbon atoms, wherein Y is alkyl which preferably contains from 1 to 6 carbon atoms; alkoxymethyl, the alkoxy moiety of which preferably contains from 1 to 6 carbon atoms; alkanoyloxymethyl, the alkanoyl moiety of which preferably contains from 2 to 6 carbon atoms; nitro; cyanoalkyl, the alkyl moiety of which preferably contains from 1 to 4 carbon atoms; haloalkyl, preferably chloroalkyl of 1 to 4 carbon atoms; and cyanoalkoxymethyl, the alkoxy moiety of which preferably contains from 2 to 4 carbon atoms; and $Y'$ is alkyl which preferably contains from 1 to 6 carbon atoms; alkoxymethyl, the alkoxy moiety of which preferably contains from 1 to 6 carbon atoms; alkanoyloxymethyl, the alkanoyl moiety of which preferably contains from 2 to 6 carbon atoms; cyanoalkyl, the alkyl moiety of which preferably contains from 1 to 4 carbon atoms; haloalkyl, preferably chloroalkyl of 1 to 4 carbon atoms; and cyanoalkoxymethyl, the alkoxy moiety of which preferably contains from 2 to 4 carbon atoms. It is preferred that Unit II above contain no more than 3 substituents bonded to carbon atoms which form part of the linear chain, and preferably still no more than 2 substituents.

A preferred class of plasticizers which are highly desirable in preparing the novel plasticized compositions are those which are characterized by the following recurring structural unit:

III 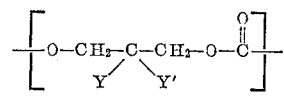

wherein Y and $Y'$ have the meanings assigned in Unit II supra. In a particularly valuable aspect, it is highly preferred that the polycarbonate polymers useful as plasticizers be characterized by both Unit III supra and recurring Unit IV below:

IV 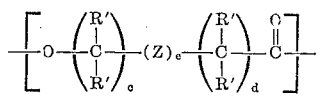

wherein each $R'$, individually, can be hydrogen, alkyl, alkoxy, halo, haloalkyl, and alkoxyalkyl, which preferably contain up to 8 carbon atoms; wherein subscripts $c$ and $d$, individually, are integers having a value greater than zero and less than 5; wherein subscript $e$ is an integer which has a value of zero or one; wherein the sum of $c+d+e$ is an integer greater than one and less than 8, preferably greater than 3 and less than 7, and more preferably the integer 5; and wherein Z is an oxy group, i.e., —O— group, or the unit.

wherein the $R'$ variables of said unit have the same values as above; with the provisos (1) that no more than three $R'$ variables attached to the carbon atoms contained in recurring Unit IV above are groups other than hydrogen, and (2) wherein the sum of $c+d+e$ cannot be an integer equal to 3. The proportions of each Unit III and VI supra in these polymers can be from about 5 to about 95 mol percent (based on the total mols of monomers polymerized therein). It is preferred that the polymers under consideration contain from about 5 to about 50 mol percent, preferably still from about 10 to about 40 mol percent of Unit III, and from about 95 to about 50 mol percent, preferably still from about 90 to about 60 mol percent of Unit IV characterized therein. In view of economic and practical considerations, it is highly preferred that both Y and Y' of Unit III be methyl, ethyl, cyanomethyl, chloromethyl, or cyanoethoxymethyl, and that the R' variables of Unit IV be hydrogen and/or methyl.

In further preferred aspects, the plasticizing agents of choice are those which contain from about 5 to about 50 mol percent, preferably from about 10 to about 40 mol percent, of one or more of the following recurring units:

V

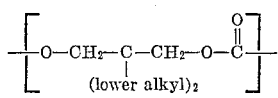

wherein each lower alkyl variable contains from 1 to 6 carbon atoms, preferably 1 to 2 carbon atoms, and preferably still each lower alkyl is methyl; and/or

VI

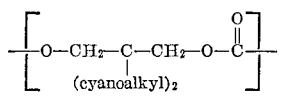

wherein each cyanoalkyl variable contains from 1 to 4 carbon atoms, and preferably wherein each cyanoalkyl variable is cyanomethyl; and/or

VII

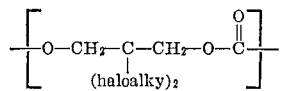

wherein each haloalkyl variable contains from 1 to 4 carbon atoms, and preferably wherein each haloalkyl variable is chloromethyl; and/or

VIII

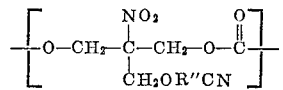

wherein R'' is alkylene, preferably alkylene of 2 to 4 carbon atoms, and preferably still R'' is ethylene

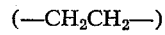

and/or

IX

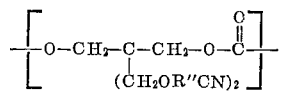

wherein each R'' has the meanings assigned in Unit VIII supra.

In addition to one or more of the recurring units designated as V through IX above, these polymers which are highly desirable as plasticizing agents in the novel plasticized compositions can contain from about 50 to 95 mol percent, preferably from about 60 to about 90 mol percent, of the recurring unit:

X

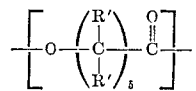

wherein each R' is hydrogen or lower alkyl, preferably hydrogen or methyl, with the proviso that no more than 3 R' variables are substituents other than hydrogen.

It is pointed out that the recurring linear units which comprise the aforesaid polymers are interconnected through the oxy group (—O—) of one unit with the carbonyl group

of a second unit. In different language, the interconnection of these units do not involve the direct bonding of two carbonyl groups, i.e.,

Moreover, since a wide range of the novel polymers are exceptionally high molecular weight products, the end groups are insignificant since macromolecules are involved. However, the end groups will depend upon the catalyst of choice, the purification techniques of the reaction product mixture, and other factors. Infra-red analysis fails to disclose the terminal moieties of the relatively high molecular weight polymeric molecules. The end groups, in general, are monovalent organic moieties such as hydrocarbyl, hydrocarbyloxy, acyl, etc., e.g., alkyl, alkoxy, aryloxy, alkanoyl, cycloalkyl, and the like. The polymer chain can also be terminated by the metal containing catalyst residue which oftentimes can be removed by conventional purification techniques, exposure to the atmosphere, and other procedures well known in the polymer art. These techniques frequently result in the formation of hydroxy end groups.

The plasticizers which are contemplated are prepared by the polymerization reaction of at least one cyclic carbonate monomer, or a mixture of cyclic carbonate monomers, in contact with various catalysts to thus produce solid polymers of said carbonates which contain a plurality of carbonate, i.e.,

groups in the essentially linear polymeric chain thereof. The average molecular weights of these solid polymers can range from about 15,000 to the low millions, e.g., from about 15,000 to about 1,000,000, and higher.

The cyclic carbonate(s) used as starting material in the aforesaid polymerization reaction are those which are free from ethylenic and acetylenic unsaturation. The cyclic carbonates are characterized in that they contain at least 6 atoms (and upwards to 21 atoms), preferably 6 atoms, in the ring nucleus which possesses the carbonate group, i.e.,

and especially, those in which the ring nucleus is composed of carbon and oxygen, said oxygen being present in the form of the carbonate group,

Etheric oxygen can also be present in said nucleus. The cyclic carbonate monomers are further characterized in that they contain no more than four substituents or groups bonded to the carbon atoms of the ring nucleus which contains the carbonate group. In a preferred aspect, these cyclic carbonate monomers are characterized in that (a) they possess the 1,3-dioxane-2-one nucleus, (b) they contain no more than 3 substituents bonded to the carbon atoms of said nucleus, and (c) both ring carbon atoms which are alpha to the oxygen atoms of the carbonate group contain no more than one substituent on each of said carbon atoms. The cyclic carbonate monomers which are composed of (1) carbon, hydrogen, and oxygen atoms, or (2) carbon, hydrogen, oxygen, and nitrogen atoms, said nitrogen atom being in the form of nitro, tertiary amino, cyanoalkoxymethyl, or cyanoalkyl (NCR—) groups represent further preferred classes. In this respect, the oxygen is always present in the form of the carbonate group,

and etheric oxygen (—O—), esteric oxygen

and/or nitro oxygen (—NO₂) may also be present in the carbonate molecule.

Among the exemplary cyclic carbonate compounds are those depicted by the following formula:

XI
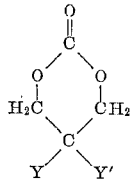

wherein Y and Y' are monovalent groups which are free of ethylenic and acetylenic unsaturation. To further illustrate these monovalent groups, Y can be hydrocarbyl, e.g., alkyl, arlkyl, and the like; hydrocarbyloxymethyl, e.g., alkoxymethyl, aralkoxymethyl, and the like; acyloxymethyl, e.g., alkanoyloxymethyl, and the like; nitro (—NO₂); and the unit

each R₁ being hydrocarbyl, that is, a monovalent hydrocarbon radical such as alkyl, and the like; Y' can be hydrocarbyl, e.g., alkyl, aralkyl, and the like; hydrocarbyloxymethyl, e.g., alkoxymethyl, aralkoxymethyl, and the like; and acyloxymethyl, e.g., alkanoyloxymethyl, and the like.

With reference to Formula XI above, illustrative Y' radicals include, for example, the alkyls, e.g., methyl, ethyl, n-propyl, isopropyl, n-butyl, sec-butyl, t-butyl, isobutyl, n-hexyl, 2-ethylhexyl, dodecyl, octadecyl, and the like; the alkoxymethyls, preferably the lower alkoxymethyls, e.g., methoxymethyl, ethoxymethyl, propoxymethyl, n - butoxymethyl, t - butoxymethyl, isobutoxymethyl, 2-ethylhexoxymethyl, decoxymethyl, and the like; the acyloxymethyls, e.g., ethanoyloxymethyl, propanoyloxymethyl, butanoyloxymethyl, hexanoyloxymethyl, octanoyloxymethyl, and the like.

With further reference to Formula XI supra, illustrative Y radicals include (in addition to the aforementioned Y' radicals), the dialkylaminos, preferably the lower dialkylaminos, e.g., dimethylamino, diethylamino, diisopropylamino, di-n-butylamino, di - sec - butylamino, di-t-butylamino, diisobutylamino, and the like. It is pointed out at this time that the terms a "lower alkyl" radical or a "lower alkoxy" radical as used herein, includes those radicals which contain from 1 to 6 carbon atoms therein. It is further preferred that the Y and Y' radicals, individually, contain no more than 12 carbon atoms each.

Exemplary classes of cyclic carbonate compounds include 4-nitro-4-alkanoyloxymethyl - 2,6 - dioxacyclohexanone, 4-dialkylamino-4-alkanoyloxymethyl - 2,6 - dioxacyclohexanone, 4 - nitro-4-alkoxymethyl-2,6-dioxacyclohexanone, 4-dialkylamino - 4 - alkoxymethyl-2,6-dioxacyclohexanone, 4-nitro-4-alkyl 2,6 - dioxacyclohexanone, 4-alkyl-4-alkyloxymethyl - 2,6 - dioxacyclohexanone, 4,4-dialkyl - 2,6 - dioxacyclohexanone, 4,4-di(alkoxymethyl)-2,6 - dioxacyclohexanone, 4,4 - di(alkanoyloxymethyl)-2,6-dioxacyclohexanone, and the like.

Specific examples of the cyclic carbonate compounds include, for instance, 4-nitro-4-methoxymethyl - 2,6-dioxacyclohexanone, 4 - nitro - 4 - propoxymethyl - 2,6-di-oxacyclohexanone, 4-nitro-4-butoxyoxymethyl - 2,6 - di- oxacyclohexanone, 4 - diethylamino - 4 - methoxymethyl-2,6-dioxacyclohexanone, 4-nitro-4-propyl - 2,6 - dioxacyclohexanone, 4-nitro-4-n-butyl - 2,6 - dioxacyclohexanone, 4-nitro-4-propanoyloxymethyl - 2,6 - dioxacyclohexanone, 4-nitro-4-butanoyloxymethyl - 2,6 - dioxacyclohexanone, 4-methyl-4-ethyl-2,6-dioxacyclohexanone, 4,4 - diethyl-2,6- dioxacyclohexanone, 4 - isopropyl-4-ethyl-2,6-dioxacyclohexanone, 4-methyl - 4 - ethoxymethyl - 2,6 - dioxacyclohexanone, 4 - methyl - 4 - propoxymethyl-2,6-dioxacyclohexanone, 4-ethyl - 4 - propoxymethyl - 2,6-dioxacyclohexanone, 4-ethyl - 4 - butoxymethyl - 2,6- dioxacyclohexanone, 4,4 - dimethyl - 2,6 - dioxacyclohexanone, 4,4 - di-n-butyl - 2,6-dioxacyclohexanone, 4,4-di-(propoxymethyl) - 2,6 - dioxacyclohexanone, 4,4 - di (butoxymethyl) - 2,6 - dioxacyclohexanone, 4,4-di(propanoyloxymethyl) - 2,6 - dioxacyclohexanone, and the like.

Further illustrative cyclic carbonates which are contemplated in the aforementioned polymerization reaction include, for instance, the mono-, di- and/or trihydrocarbyl substituted 2,6-dioxacyclohexanones such as 3- and/or 4- and/or 5 - alkyl - 2,6 - dioxacyclohexanones and the 3- and/or 4- and/or 5 - aralkyl-2,6-dioxacyclohexanones, e.g., 3- and/or 4 - methyl - 2,6-dioxacyclohexanone, 3- and/or 4 - ethyl - 2,6 - dioxacyclohexanone, 3- and/or 4 - propyl - 2,6 - dioxacyclohexanone, 3- and/or 4-isopropyl - 2,6 - dioxacyclohexanone, 3- and/or 4-n-butyl-2,6-dioxacyclohexanone, 3- and/or 4-isobutyl - 2,6 - dioxacyclohexanone, 3- and/or 4-t-butyl -2,6 - dioxacyclohexanone, and the like; the 2,4,5-tri(lower alkyl)-2,6-dioxacyclohexanones, e.g., 3,4,5-trimethyl-2,6-dioxacyclohexanone, 3,4,5-triethyl-2,6-dioxacyclohexanone, and the like; the polymethylene carbonates which have at least 6 atoms in the ring nucleus which contains the carbonate group, e.g., trimethylene carbonate, decamethylene carbonate, undecamethylene carbonate, dodecamethylene carbonate, tridecamethylene carbonate, octadecamethylene carbonate, and the like; the polyoxyalkylene carbonates, e.g., triethylene glycol carbonate, tetraethylene glycol carbonate, and the like; the 4,4-di(halomethyl) - 2,6 - dioxacyclohexanone, such as the 4,4-di(chloromethyl)-2,6 dioxacyclohexanone, etc.; 4,4-di(cyanomethyl) - 2,6-dioxacyclohexanone; 3 - chloromethyl - 2,6 - dioxacyclohexanone; and 3-cyanomethyl-2,6 - dioxacyclohexanone.

The preparation of 4-nitro-4-hydrocarbyloxymethyl-2,6-dioxacyclohexanone or 4-nitro-4-acyloxymethyl - 2,6-dioxacyclohexanone, etc., is effected by the following sequence of steps:

(1)
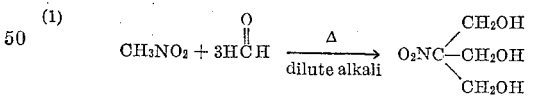

Equation 1 supra represents an aldol-like condensation reaction which can be conducted in the presence of a basic catalyst, e.g., a dilute alkali metal hydroxide solution, at a moderately elevated temperature. The product, i.e., tris)hydroxymethyl)-nitromethane, is then contacted with a hydrocarbyl halide or an acyl halide which is designated as R''X in Equation 2 below:

(2)
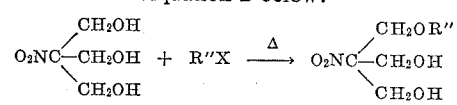

The resulting monoetherified product or monoesterified product, as may be the case, then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates

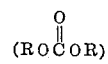

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals, the titanates having the general formulae $Y_2TiO_3$ and $Y_4TiO_4$ in which the Y's are alkyl, aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. Equation 3 infra illustrates the cyclization step whereby the nitro substituted carbonate compound is formed.

(3)
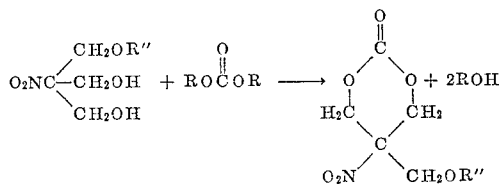

The R″ radical in Equation 3 above is hydrocarbyl or acyl.

The preparation of 4-tertiary amino-4-hydrocarbyloxymethyl-2,6-dioxacyclohexanone or 4-tertiary amino-4-acyloxymethyl-2,6-dioxacyclohexanone can be accomplished by contacting the monoetherified product or monoesterified of Equation 2 supra with hydrogen, in the presence of conventional hydrogenation catalysts, e.g., Raney nickel, platinum, and the like, at an elevated temperature, followed by alkylation of the resulting primary amino group (—NH$_2$) with, for example, a stoichiometric quantity of a hydrocarbyl halide, preferably in the presence of a base, e.g., an alkali metal hydroxide, to thus convert, said —NO$_2$ group to a tertiary amino group, i.e., $$-N\begin{matrix}R'''\\R'''\end{matrix}$$

(4)
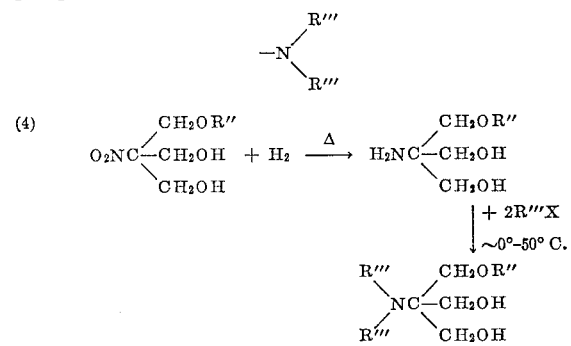

The resulting tertiary amino compounds are readily cyclized to the corresponding carbonates by following the procedure shown in Equation 3 supra.

The 4-nitro-4-hydrocarbyl-2,6-dioxacyclohexanones and 4-t-amino-4-hydrocarbyl-2,6-dioxacyclohexanones, can be prepared by the reaction of a hydrocarbyl substituted nitromethane, i.e., RCH$_2$NO$_2$ wherein R is an alkyl, aryl, cycloalkyl, aralkyl, alkaryl, etc., with an excess of formaldehyde, as shown in the following equation:

(5)
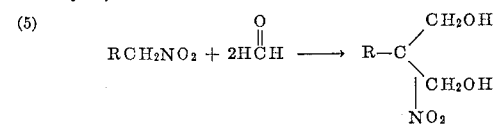

The resulting 2-nitro-2-hydrocarbyl-1,3-propanediol compound in Equation 5 then can be subjected to the cyclization step illustrated in Equation 3 supra, or it can undergo the sequence of steps illustrated in Equation 4, thus producing the corresponding various nitro and tertiary amino substituted carbonates.

The preparation of 4,4-di(hydrocarbyl)-2,6-dioxacyclohexanone is accomplished by an aldol condensation of the appropriate aldehyde which contains one alpha hydrogen atom, with formaldehyde, followed by a Cannizzaro reaction with additional formaldehyde. Equation 6 depicts the over-all reaction:

(6)
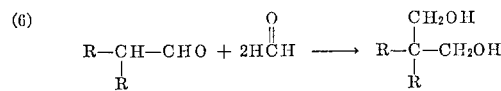

Both R's in Equation 6 represent hydrocarbyl groups. The resulting 2,2-di(hydrocarbyl)-1,3-propanediol then can be subjected to the cyclization step discussed in Equation 3 to yield 4,4-di(hydrocarbyl)-2,6-dioxacyclohexanone.

The preparation of 4-hydrocarbyl-4-hydrocarbyloxymethyl-2,6-dioxacyclohexanone or 4-hydrocarbyl-4-acyloxymethyl-2,6-dioxacyclohexanone is conveniently prepared by employing an aldehyde which contains two alpha hydrogen atoms in Equation 6 supra, that is:

(7)
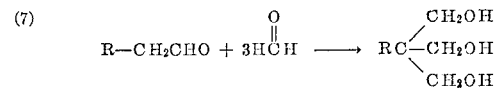

The resulting 1-hydrocarbyl-1,1,1-trimethylolmethane then can be reacted with R″X of Equation 2 supra, followed by the cyclization step of Equation 3 to obtain the cyclic carbonate under consideration.

The 4,4-di(hydrocarbyloxymethyl)-2,6-dioxacyclohexanones or 4,4-di(acyloxymethyl)-2,6-dioxacyclohexanones are prepared by the reaction of pentaerythritol with sufficient R″X (note Equation 2) to produce the diether or diester of pentaerythritol which, in turn, can be cyclized (note Equation 3) to yield the corresponding carbonates. Equation 8 below illustrates the over-all reactions.

(8)
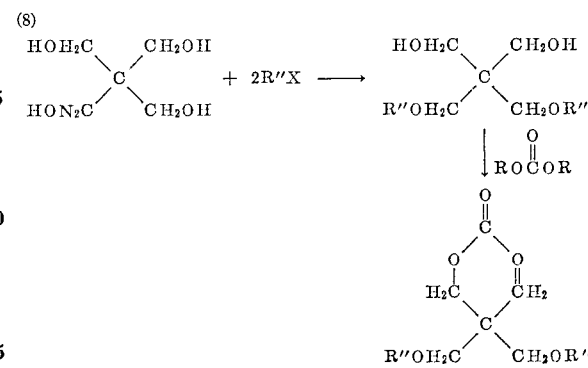

The 4-substituted-4-cyanoalkoxymethyl-2,6-dioxacyclohexanones wherein the 4-substituted moiety is hydrocarbyl, nitro, or tertiary amino such as those illustrated previously can be prepared by reacting a molar excess of 1-hydrocarbyl-1,1,1-trimethylolmethane or 1-nitro-1,1,1-trimethylolmethane with an alpha, beta-unsaturated nitrile such as the 2-alkenenitriles, e.g., acrylonitrile, and then cyclizing the 2-substituted-2-cyanoalkoxymethyl-1,3-propanediol to the corresponding carbonate. The nitro group (—NO$_2$) of the 2-nitro-2-cyanoalkoxymethyl-1,3-propanediols can be hydrogenated to the amino group (—NH$_2$), followed by alkylating the —NH$_2$ group to the tertiary amino group (—NR$_2$), and then cyclizing the 2-tertiary amino-2-cyanoalkoxymethyl-1,3-propanediols to the 4-tertiary amino-4-cyanoalkoxymethyl-2,6-dioxacyclohexanones. The 4,4-di-(cyanoalkoxymethyl)-2,6-dioxacyclohexanones prepared by reacting one mol of pentaerythritol with two moles of 2-alkenenitrile, e.g., acrylonitrile, to yield 2,2-di(cyanoalkoxymethyl)-1,3-propanediol, followed by cyclizing to produce the subject carbonate.

The various 3- and/or 4- and/or 5-hydrocarbyl-2,6-dioxacyclohexanones can be prepared by cyclizing the appropriate mono-, di-, or trisubstituted 1,3-propanediol to produce the corresponding cyclic carbonate.

The 4,4-di(halomethyl)-2,6-dioxacyclohexanones such as 4,4-di(chloromethyl)-2,6-dioxacyclohexanone can be prepared by cyclizing pentaerythritol dichloride with dialkyl carbonate; 4,4-di(cyanomethyl)-2,6-dioxacyclohexanone can be prepared by reacting one mol of pentaerythritol dichloride with two mols of an alkali metal cyanide to thus yield the 2,2-di(cyanomethyl)-1,3-propanediol which, in turn, can be cyclized to give the subject carbonate; 3-chloromethyl-2,6-dioxacyclohexanone and 3-cyanomethyl-2,6-dioxacyclohexanone prepared by cyclizing 4-chloro-1,3-butanediol and 4-cyano-1,3-butanediol, respectively. The preparation of various cyclic carbonates is further described in applications Serial No. 311,673, filed September 26, 1963, Serial No. 311,622, filed September 26, 1963, and Serial No. 325,140, filed November 20, 1963.

In addition to the aforesaid cyclic carbonates, there can be present in the polymerization media one or more cyclic esters characterized by the following formula:

XII
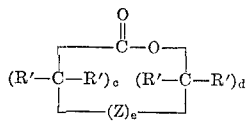

wherein each R′, individually, can be hydrogen, alkyl, halo, haloalkyl, alkoxyalkyl, alkoxy, and the like; wherein Z can be an oxy (—O—) group or a divalent saturated aliphatic hydrocarbon group, and the like; wherein $c$ is an integer of from 1 to 4, inclusive; wherein $d$ is an integer of from 1 to 4, inclusive; wherein $e$ is an integer having a value of zero or one; with the provisos that (a) the sum of $x+y+z$ cannot equal 3, and (b) the total number of organic substituents (such as those described for the R′ variables) attached to the carbon atoms contained in the cyclic ester ring does not extend 4, preferably does not exceed 3.

With reference to Formula XII supra, illustrative R′ radicals include, among others, methyl, ethyl, n-propyl, isopropyl, n-butyl, sec-butyl, t-butyl, amyl, the hexyls, chloromethyl, chloroethyl, bromopropyl, bromobutyl, chloro, bromo, iodo, methoxymethyl, ethoxyethyl, propoxymethyl, butoxypropyl, methoxy, ethoxy, n-butoxy, isopentoxy, n-hexoxy, 2-ethylhexoxy, and the like. It is preferred that each R′, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve.

Representative monomeric cyclic esters which can be employed in the polymerization reaction include, for example, beta-propiolactone; delta-valerolactone; epsilon-caprolactone; 7-hydroxyheptanoic acid lactone; 8-hydroxyoctanoic acid lactone; the alpha, alpha-dialkyl-beta-propiolactones, e.g., alpha, alpha-dimethyl-beta-propiolactone, alpha, alpha-diethyl-beta-propiolactone, and the like; the monoalkyl-delta-valerolactones, e.g., the monomethyl-, monoethyl-, monoisopropyl-, monobutyl-, monohexyl-, monodecyl-, and monododecyl-delta-valerolactones, and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyl-, dialkyl-, or trialkyl-epsilon-caprolactones, e.g., the monomethyl-, monoethyl-, monoisopropyl-, monohexyl-, mono-n-octyl-, dimethyl-, diethyl-, di-n-propyl, diisobutyl, di-n-hexyl-, trimethyl-, triethyl-, and tri-n-propyl-epsilon-caprolactones, and the like; the monoalkoxy- and dialkoxy-delta - valerolactones and epsilon-caprolactones, e.g., monomethoxy-, monoethoxy-, mono-isopropoxy-, dimethoxy-, diethoxy-, and dibutoxy-delta-valerolactones and epsilon-caprolactones, and the like. Further illustrative cyclic esters include 3-ethyl-2-keto-1,4-dioxane, alpha, alpha-bis(chloromethyl) - propiolactone, 1,4 - dioxane-2-one, 3-n-propyl-2-ketone-1,4-dioxane, and the like.

The polymerization reaction can be effected in the presence of various catalysts which include, by way of illustrations, di-n-propylzinc, diisopropylzinc, di-n-butylzinc, di-t-butylzinc, diisobutylzinc, di-2-ethylhexylzinc, dimethylmagnesium, dipropyl-magnesium, n-butylmagnesium chloride, dimethylcadmium, diethylcadmium, dipropylcadmium, diisobutylcadmium, diisoamylcadmium, triethylaluminum, tri-n-propylaluminum, triisopropylaluminum, tri-n-butylaluminum, tri-t-butylaluminum, triisobutylaluminum, aluminum triisopropoxide, n-butyllithium, and the like.

The catalysts are employed in catalytically significant quantities. For optimum results, the particular catalyst employed, the nature of the monomeric reactant(s), the operative conditions under which the polymerization reaction is conducted, and other factors, will largely determine the desirable catalyst concentration. In general, a catalyst concentration in the range of from about 0.001, and lower, to about 5, and higher, weight percent, based on the weight of total monomeric feed, is suitable. A catalyst concentration in the range of from about 0.01 to about 2.0 weight percent is generally preferred.

The polymerization reaction can be conducted over a wide temperature range. Depending upon various factors such as the nature of the monomeric reactant(s) employed, the particular catalyst employed, the concentration of the catalyst, and the like, the reaction temperature can be as low as —20° C., and lower, and as high as 250° C., and higher. A suitable temperature range is from about 0° C. to about 225° C.

In general, the reaction time will vary depending upon the operative temperature, the nature of the monomeric reactant(s) employed, the particular catalyst and concentration employed, the use of an inert normally liquid organic vehicle, and other factors. The reaction time can vary from several seconds to several days depending upon the variables illustrated immediately above. A feasible reaction period is from about a few minutes to about 10 hours, and longer.

The polymerization reaction preferably is initiated in the liquid phase. It is desirable to effect the polymerization reaction under an inert atmosphere, e.g., nitrogen.

The polycarbonate polymeric products can be prepared via the bulk polymerization, suspension polymerization, or the solution polymerization routes. The polymerization reaction can be carried out in the presence of an inert normally-liquid organic vehicle.

The polymerization reaction can be executed in a batch, semi-continuous, or continuous fashion. The reaction vessel can be a glass vessel, steel autoclave, elongated metallic tube, or other equipment and material employed in the polymer art. The order of addition of catalyst and monomeric reactant(s) does not appear to be critical.

Unreacted monomeric reactant oftentimes can be recovered from the reaction product by conventional techniques such as by heating said reaction product under reduced pressure. Removal of unreacted monomeric reactant(s) and/or inert organic vehicle can be accomplished by mechanical means such as treatment of the reaction product in a Marshall mill and the like. The polymer product also can be recovered from the reaction product by washing said reaction product with an inert normally-liquid organic vehicle, e.g., heptane, and subsequently drying same under reduced pressure at slightly elevated temperatures. Another route involves dissolution in a first inert organic vehicle, followed by the addition of a second inert organic vehicle which is miscible with the first vehicle but which is a non-solvent for the polymer product, thus precipitating the polymer product. If desired, the reaction product can be dissolved in an inert organic vehicle such as acetone, and the like, followed by the addition of sufficient water to the resulting solution, said water being miscible with said inert organic vehicle but being a non-solvent for the water-insoluble polymer thereby precipitating the polymer product. Recovery of the precipitated polymer can be effected by filtration, decantation, etc., followed by drying same as indicated previously. The preparation of the various solid polycarbonate polymers is further described in application Serial No. 311,674, filed September 26, 1963.

The polycarbonate polymeric products described in this specification are eminently suitable as plasticizers for various plasticizable solid polymeric materials, especially those polymeric materials which are prepared from at least one monomer which contains the group $CH_2=C<$ such as the vinyl and vinylidiene resins, for example; the polyvinyl chlorides; the vinyl chloride-vinyl acetate copolymers; the vinyl chloride-vinylidene chloride copolymers; the polyvinylidene chlorides; the vinylidiene chloride-acrylonitrile copolymers; the polyvinyl acetals; the polyvinyl butyrals; the polystyrenes; the poly(methyl acrylates); the vinyl chloride-acrylonitrile copolymers; the acylonitrile-vinyl chloride-vinylidene chloride copolymers; natural rubber; the polybutadienes; the polyisoprenes; the butadiene-acrylonitrile copolymers; the chloroprenes; the butadiene-styrene copolymers; the ethylene-propylene copolymers; and the like. The aforesaid plasticizable solid polymeric materials are well known to the art.

The amount of plasticizing agent which can be employed is readily ascertainable by those possessing ordinary skill in the plasticizing art. The plasticizing agent of choice, the molecular weight of the plasticizing agent, the particular resin to be plasticized, the incorporation of additional additives such as stabilizers, etc., into the system, and other well known factors, will influence, to an extent, the quantity of plasticizer to be used for optimum results. Consequently, by the term "plasticizing amount," as used herein including the appended claims, is meant that quantity of plasticizing agent which will appreciably increase the flexibility, processability, workability, and/or distensibility of the material with which it is admixed. The concentration of polycarbonate plasticizer in the resin can be within the range of from about 10 to about 125 parts per 100 parts of resin, although concentrations above and below the aforesaid range can be employed. Thus, as little as one part of the polycarbonate plasticizers to 100 parts of the resin may have a measurable effect on the stiffness of the mixture while the upper limit would be determined by the degree of flexibility that the end use might require.

As indicated above, the plasticizers can be homopolymers of cyclic carbonates, copolymers of cyclic carbonates and cyclic esters, copolymers of a mixture of cyclic carbonates, etc. In addition to the aforesaid exemplary plasticizers, the novel plasticized compositions can contain various conventional plasticizers, e.g., di(2-ethylhexyl) phthalate, epoxidized esters such as di(2-ethylhexyl) 4,5-epoxycyclohexane-1,2-dicarboxylate, etc.; stabilizers such as metallic fatty acid soaps, dibutyl tin maleate, etc.; and other well known additives.

In general, any one of several known methods of mixing and fluxing can be utilized in the preparation of the novel plasticized compositions of the invention. For instance, the resin and plasticizer can be intimately dispersed by stirring or tumbling and the admixture fluxed into a continuous sheet on a steam-heated roll mill. Other methods of mixing and fluxing, such as Banbury cycle followed by calendaring can also be employed.

Plasticized compositions are prepared by fluxing the polycarbonate compositions of the illustrative examples infra with resins on a two-roll mill at the temperatures indicated until a clear vinyl sheet is obtained. Tests specimens are prepared by molding at 158° C. in accordance with the various tests outlined below.

The mixtures of alkyl-substituted epsilon-caprolactones described in the following examples are prepared from the alkyl-substituted cyclohexanones according to the method described by Starcher and Phillips in JACS 80, 4079 (1958). Accordingly, by way of example, a mixture of alpha-methyl- and epsilon-methyl-epsilon-caprolactones is synthesized by reacting 2-methylcyclohexanone, which can be obtained by the hydrogenation of orthocresol to 2-methylcyclohexanol followed by dehydrogenation of said secondary alcohol to the corresponding ketone, with peracetic acid. By utilization of 3-methylcyclohexanone as the co-reactant with peracetic acid there is obtained a mixture of beta-methyl- and delta-methyl-epsilon-caprolactones. The 3-methylcyclohexanone can be synthesized by hydrogenation of meta-cresol to 3-methylcyclohexanol followed by dehydrogenation of said alcohol to the corresponding ketone. Reaction of 4-methylcyclohexanone with peracetic acid yields gamma-methyl - epsilon - caprolactone. The 4-methylcyclohexanone is obtained from para-cresol in identical manner as the other substituted cyclohexanones.

By the foregoing methods it is also feasible to prepare mixtures of dimethyl - substituted-epsilon-caprolactones, and higher alkyl-substituted-epsilon-caprolactones. For example, mixtures of dimethyl-substituted-epsilon-caprolactones may be obtained from xylenol mixtures commercially known as "cresylic acids." These phenolic mixtures upon hydrogenation and dehydrogenation as described above yield mixtures of dimethyl-substituted cyclohexanones. Reaction of such dimethyl-substituted cyclohexanones with peracetic acid results in dimethyl-substituted-epsilon-caprolactones. Other commercial products which are of importance are the cresols obtained from coal tars or from the petroleum industry. For example, mixtures of ortho-, meta-, and para-cresol, or mixtures of meta- and para-cresol upon conversion to methyl-cyclohexanones and reaction with peracetic acid will yield mixtures of methyl-substituted epsilon-caprolactones.

In the following illustrative examples, various polycarbonates are evaluated as plasticizers for vinyl resins. In reporting the physical properties of the plasticized vinyl resin compositions certain symbols and abbreviations are employed. Unless otherwise indicated, they are defined as follows:

(1) $T_B$ (brittle temperature) is a measure of flexibility at low temperature and is determined by an impact test in accordance with A.S.T.M. Method D 746–55T.

(2) *Oil extraction* (test temperature of 50° C.) determined in accordance with the formula:

$$E_1 = \frac{100(W_1 - W_2)}{W_2}$$

wherein $E_1$ is the weight percent extraction of plasticizer, wherein $W_1$ is the original weight of the plasticized sample (four mil film), and wherein $W_2$ is the final weight of the plasticized sample after subjecting sample to mineral oil extraction test for a period of time, followed by drying in a circulating air oven at 70° C. for 30 minutes.

(3) *Tensile*, or ultimate strength, is measured on a Scott L–6 Tensile Tester using annular specimens (1.75" I.D. and 2.00" O.D.—0.060" to 0.080" thick). The L–6 is operated at a constant rate of elongation of 4 feet per minute at 25° C.

(4) *Elongation* (or percent ultimate elongation) is the increase in length at rupture with the sample at 24° C.

(5) *ASTM stiffness modulus*, or flexural stiffness at 24.5° C., is measured with a Tinius Olsen Flexural Stiffness Tester, in accordance with ASTM Method D747–50.

(6) *Temperature-stiffness characteristics*, $T_F$ and $T_4$, are determined with a Clash-Berg Torsional Stiffness Tester in accordance with ASTM Method D1043–51. The values listed as $T_F$ and $T_4$ are the temperatures at which a torsional stiffness of 135,000 and 10,000 p.s.i., respectively, are reached.

(7) *Volatility* is determined in a 24-hour, activated carbon test at 70° C., in accordance with ASTM Method D1203–55.

(8) *Durometer "A"* hardness is a measure of resistance of indentation of an 0.25 inch specimen by a pin equipped with a truncated cone point as described in ASTM Method D-676-49T.

(9) $I_r$=Reduced viscosity value of plasticizer in 100 milliliters of a given solvent at given temperature. The reduced viscosity values of the polycarbonate plasticizers are determined at a concentration of 0.2 gram of said polycarbonate per 100 milliliters of chloroform at 30° C. The inherent viscosity of the vinyl resin, unless otherwise indicated, is determined at a concentration of 0.2 gram per 100 milliliters of cyclohexanone at 30° C.

*Example 1*

Poly(vinyl chloride), inherent viscosity of 0.75, is mechanically mixed with 45 weight percent of a copolymer[1] of 60 parts by weight of epsilon-caprolactone and 40 parts by weight of 4,4-diethyl-2,6-dioxacyclohexanone ($I_r$=1.8). The aforesaid copolymer is prepared by the polymerization reaction of the appropriate monomers in the presence of dibutylzinc catalyst at 90° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, ° C.), very slight oil and water extraction, and extremely low volatile loss.

*Example 2*

Poly(vinyl chloride), inherent viscosity of 0.80, is mechanically mixed with 40 weight percent of a copolymer of 75 parts by weight of epsilon-caprolactone and 25 parts of by weight of 4-nitro-4-methyl-2,6-dioxacyclohexanone ($I_r$=1). The aforesaid copolymer is prepared by the polymerization reaction of the appropriate monomers in the presence of diethylcadmium catalyst at 90° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, ° C.), very slight oil and water extraction, and extremely low volatile loss.

*Example 3*

Poly(vinyl chloride), inherent viscosity of 1, is mechanically mixed with 45 weight percent of a copolymer of 80 parts by weight of epsilon-caprolactone and 20 parts by weight of 4-nitro-4-methoxymethyl-2,6-dioxacyclohexanone ($I_r$=0.7). The aforesaid copolymer is prepared by the polymerization reaction of the appropriate monomers in the presence of diethylzinc catalyst at 90° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, ° C.), very slight oil and water extraction, and extremely low volatile loss.

*Example 4*

Poly(vinyl chloride), inherent viscosity of 1.1, is mechanically mixed with 50 weight percent of a copolymer of 75 parts by weight of epsilon-caprolactone and 25 parts by weight of 4,4-di(chloromethyl)-2,6-dioxacyclohexanone ($I_r$=1.1). The aforesaid copolymer is prepared by the polymerization reaction of the appropriate monomers in the presence of n-butyllithium catalyst at 50° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, ° C.), very slight oil and water extraction, and extremely low volatile loss.

[1] In the examples, weight percent of the plasticizer is based on the weight of the plasticizable resin.

*Example 5*

Poly(vinyl chloride), inherent viscosity of 1.1, is mechanically mixed with 50 weight percent of a copolymer of 90 parts by weight of epsilon-caprolactone and 10 parts by weight of 4,4-di(cyanomethyl)-2,6-dioxacyclohexanone ($I_r$=1.2). The aforesaid copolymer is prepared by the polymerization reaction of the appropriate monomers in the presence of diethylzinc at 90° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, ° C.), very slight oil and water extraction, and extremely low volatile loss.

*Example 6*

Poly(vinyl chloride), inherent viscosity of 0.8, is mechanically mixed with 50 weight percent of a copolymer of 95 parts by weight of epsilon-caprolactone and 5 parts by weight of 4-cyanoethyl-4-ethyl-2,6-dioxacyclohexanone which has a reduced viscosity value of 1.2. The aforesaid copolymer is prepared by the polymerization reaction of the appropriate monomers in the presence of triethylaluminum catalyst at 90° C. The resulting admixture of vinyl resin and plasticizer then is fluxed on a steam-heated, two-roll mill at 158° C. The resulting plasticized composition is charatcerized by low stiffness modulus at 25° C., unusually low brittle temperature ($T_B$, ° C.), very slight oil and water extraction, and extremely low volatile loss.

*Example 7*

Poly(vinyl chloride), inherent viscosity of 1.1, is mechanically mixed with 45 weight percent of a copolymer of 60 parts by weight of epsilon-caprolactone, 20 parts by weight of a mixture of methyl-substituted-epsilon-caprolactones, and 20 parts by weight of 4,4-dimethyl-2,6-dioxacyclohexanone ($I_r$=0.9). The aforesaid copolymer is prepared by the polymerization reaction of the appropriate monomers in the presence of n-butyllithium at 50° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, ° C.), very slight oil and water extraction, and extremely low volatile loss.

*Example 8*

Poly(vinyl chloride), inherent viscosity of 0.8, is mechanically mixed with 45 weight percent of a copolymer of 25 parts by weight of a mixture of methyl-substituted-epsilon-caprolactones and 75 parts by weight of 4,4-dimethyl-2,6-dioxacyclohexanone ($I_r$=0.6). The aforesaid copolymer is prepared by the polymerization reaction of the appropriate monomers in the presence of lithium hydride catalyst at 110° C. The resulting admixture of vinyl resin and plasticizer then is fluxed on a steam-heated, two-roll mill at 158° C. The resulting plasticized composition is charcterized by low stiffness modulus at 25° C., unusually low brittle temperature ($T_B$, ° C.), very slight oil and water extraction.

*Example 9*

Poly(vinyl chloride), inherent viscosity of 1.1, is mechanically mixed with 40 weight percent of a copolymer of 80 parts by weight of epsilon-caprolactone, 10 parts by weight of a mixture of dimethyl-substituted-caprolactones, and 10 parts by weight of 4,4-dimethyl-2,6-dioxacyclohexanone ($I_r$=1.0). The aforesaid copolymer is prepared by the polymerization reaction of the appropriate monomers in the presence of n-butylzinc butoxide at 90° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, °C.), very slight oil and water extraction, and extremely low volatile loss.

Example 10

Poly(vinyl chloride), inherent viscosity of 0.95, is mechanically mixed with 45 weight percent of a copolymer of 40 parts by weight of mixed dimethyl-substituted-epsilon-caprolactone and 60 parts by weight of 4,4-dimethyl-2,6-dioxacyclohexanone ($I_r=0.7$). The aforesaid copolymer is prepared by the polymerization reaction of the appropriate monomers in the presence of a catalytic amount of the reaction product of equal molar amounts of triisobutylaluminum and water at 90° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, °C.), very slight oil and water extraction.

Example 11

Poly(vinyl chloride), inherent viscosity of 0.75, is mechanically mixed with 45 weight percent of a homopolymer of 4,4-dimethyl-2,6-dioxacyclohexanone ($I_r=1.2$). The aforesaid homopolymer is prepared by the polymerization of the appropriate monomer in the presence of n-butyllithium catalyst at 70° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, °C.), very slight oil and water extraction.

Example 12

Poly(vinyl chloride), inherent viscosity of 0.8, is mechanically mixed with 45 weight percent of a copolymer of 80 parts by weights of 4,4-dimethyl-2,6-dioxacyclohexanone and 20 parts by weight of 4-ethyl-4-cyanoethyloxymethyl-2,6-dioxacyclohexanone ($I_r=1.5$). The aforesaid copolymer is prepared by the polymerization of the appropriate monomers in the presence of dibutylzinc catalyst at 90° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, °C.), very slight oil and water extraction.

Example 13

A vinyl chloride-vinyl acetate copolymer consisting of 91 parts by weight of vinyl chloride and 9 parts by weight of vinyl acetate, inherent viscosity of 0.95, is mechanically mixed with 45 weight percent of a copolymer of 75 parts by weight of epsilon-caprolactone and 25 parts by weight of 4,4-dimethyl-2,6-dioxacyclohexanone ($I_r=1.3$). The aforesaid copolymer is prepared by the polymerization of the appropriate monomers in the presence of n-butyllithium as the catalyst at 50° C. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, °C.), very slight oil and water extraction, and extremely low volatile loss.

Example 14

A vinyl chloride-acrylonitrile copolymer consisting of 85 parts by weight of vinyl chloride and 15 parts by weight of acrylonitrile, inherent viscosity of 1.1, is mechanically mixed with 50 weight percent of the copolymer described in Example 13. The resulting admixture of vinyl resin and plasticizer then is fluxed on a steam-heated, two-roll mill at 158° C. The resulting plasticized composition is characterized by low stiffness modulus at 25° C., unusually low brittle temperature ($T_B$, °C.), very slight oil and water extraction, and extremely low volatile loss.

Example 15

Poly(vinyl chloride), inherent viscosity of 0.8, is mechanically mixed with 48 weight percent of a copolymer of 150 parts by weight of epsilon-caprolactone, and 50 parts by weight of 2,6-dioxacyclohexanone ($I_r=1.8$) which is prepared by reacting the appropriate monomers in the presence of di-n-butylzinc at 90° C. The resulting admixture of vinyl resin and plasticizer then is fluxed on a steam-heated two-roll mill at 158° C. The resulting plasticized composition shows the following physical characteristics:

| | |
|---|---|
| Tensile strength, p.s.i. | 1810 |
| Elongation, percent | 345 |
| Load at 100% elongation, p.s.i. | 790 |
| Instron stiffness modulus at 25° C., p.s.i. | 610 |
| $T_F$, °C. | −25 |
| $T_4$, °C. | −5 |
| $T_B$, °C. | −38 |
| Durometer "A" hardness | 57 |
| Oil extraction, 50° C., percent | 0.1 |
| Volatile loss, percent in 24 hrs. at 70° C. | 0.2 |

What is claimed is:

1. A plasticized composition consisting essentially of a plasticizable solid polymeric material and, as the plasticizer therefor, a solid polycarbonate polymer which has an average molecular weight of at least about 15,000 and which contains the following recurring unit:

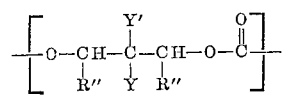

wherein each R″ is of the group consisting of hydrogen an alkyl; wherein Y is of the group consisting of alkyl, alkoxymethyl, alkanoyloxymethyl, nitro, cyanoalkyl, haloalkyl, and cyanoalkoxymethyl; and wherein Y′ is alkyl, alkoxymethyl, alkanoyloxymethyl, cyanoalkyl, haloalkyl, and cyanoalkoxymethyl.

2. A plasticized composition consisting essentially of a vinyl resin and, as the plasticizer therefor, a solid polycarbonate polymer which has an average molecular weight of at least about 20,000 and which contains from about 5 to about 95 mol percent of the following recurring unit (I):

I 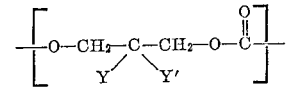

wherein Y is of the group consisting of alkyl, alkoxymethyl, alkanoyloxymethyl, nitro, cyanoalkyl, haloalkyl, and cyanoalkoxymethyl; and wherein Y′ is alkyl, alkoxymethyl, alkanoyloxymethyl, cyanoalkyl, haloalkyl, and cyanoalkoxymethyl; and from about 95 to about 5 mol percent of the following recurring unit (II)

II 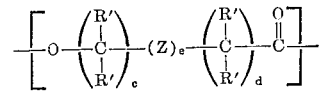

wherein each R′, individually, is of the group consisting of hydrogen, alkyl, alkoxy, halo, haloalkyl, and alkoxyalkly; wherein subscripts $c$ and $d$, individually, are integers having a value greater than zero and less than 5; wherein subscript $e$ is an integer which has a value of zero or one; wherein the sum of $c+d+e$ is an integer greater than one and less than 8; and wherein Z is of the group consisting of oxy and the structural unit:

wherein the R′ variables of said structural unit have the same values as above; with the provisos (1) that no more than three R' variables attached to the carbon atoms contained in recurring unit (II) above are groups other than hydrogen, and (2) wherein the sum of $c+d+e$ cannot be an integer equal to 3.

3. The plasticized composition of claim 2 wherein said solid polycarbonate polymer contains from about 5 to about 50 mol percent of recurring unit (I) and from about 95 to about 50 mol percent of recurring unit (II).

4. The plasticized composition of claim 3 wherein said plasticizable solid polymeric material is a vinyl resin.

5. The plasticized composition of claim 4 wherein said plasticizable solid polymeric material is a vinylidene resin.

6. A plasticized composition consisting essentially of a vinyl chloride resin and, as the plasticizer therefor, a solid polycarbonate polymer which has an average molecular weight of at least about 20,000 and which contains from about 10 to about 40 mol percent of the following recurring unit (I):

I 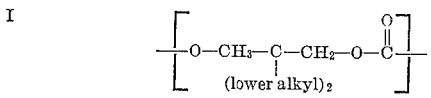

wherein each lower alkyl variable contains from 1 to 6 carbon atoms; and from about 60 to about 90 mol percent of the following recurring unit (II):

II 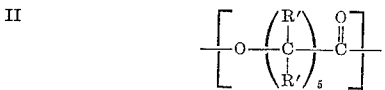

wherein each R' is of the group consisting of hydrogen and lower alkyl, with the proviso that no more than 3 R' variables are substituents other than hydrogen.

7. The plasticized composition of claim 6 wherein the lower alkyl variables of unit (I) are methyl.

8. A plasticized composition consisting essentially of a vinyl chloride resin and, as the plasticizer therefor, a solid polycarbonate polymer which has an average molecular weight of at least about 20,000 and which contains from about 10 to about 40 mol percent of the following recurring unit (I):

I 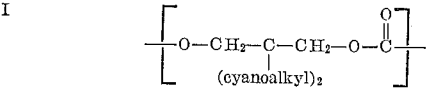

wherein each cyanoalkyl variable contains from 1 to 4 carbon atoms; and from about 60 to about 90 mol percent of the following recurring unit (II):

II 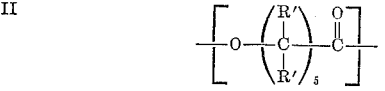

wherein each R' is of the group consisting of hydrogen and lower alkyl, with the proviso that no more than 3 R' variables are substituents other than hydrogen.

9. The plasticized composition of claim 8 wherein the cyanoalkyl variables of unit (I) are cyanomethyl.

10. A plasticized composition consisting essentially of a vinyl chloride resin and, as the plasticizer therefor, a solid polycarbonate polymer which has an average molecular weight of at least about 20,000 and which contains from about 10 to about 40 mol percent of the following recurring unit (I):

I 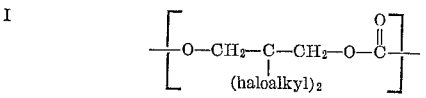

wherein each haloalkyl variable contains from 1 to 4 carbon atoms; and from about 60 to about 90 mol percent of the following recurring unit (II):

II 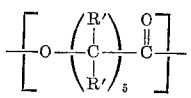

wherein each R' is of the group consisting of hydrogen and lower alkyl, with the proviso that no more than 3 R' variables are substituents other than hydrogen.

11. The plasticized composition of claim 10 wherein the haloalkyl variables are chloromethyl.

12. A plasticized composition consisting essentially of a vinyl chloride resin and, as the plasticizer therefor, a solid polycarbonate polymer which has an average molecular weight of at least about 20,000 and which contains from about 10 to about 40 mol percent of the following recurring unit (I):

I 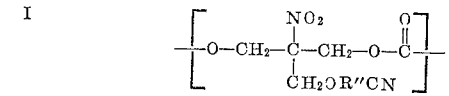

wherein R'' is alkylene of 2 to 4 carbon atoms; and from about 60 to about 90 mol percent of the following recurring unit (II):

II 

wherein each R' is of the group consisting of hydrogen and lower alkyl, with the proviso that no more than 3 R' variables are substituents other than hydrogen.

13. The plasticized composition of claim 12 wherein the R'' variable of unit (I) is ethylene.

14. A plasticized composition consisting essentially of a vinyl chloride resin and, as the plasticizer therefor, a solid polycarbonate polymer which has an average molecular weight of at least about 20,000 and which contains from about 10 to about 40 mol percent of the following recurring unit (I):

I 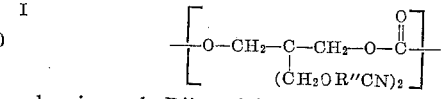

wherein each R'' variable is alkylene of 2 to 4 carbon atoms; and from about 60 to about 90 mol percent of the following recurring unit (II):

II 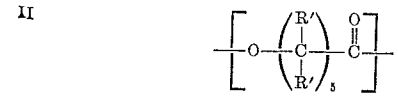

wherein each R' is of the group consisting of hydrogen and lower alkyl, with the proviso that no more than 3 R' variables are substituents other than hydrogen.

15. The plasticized composition of claim 14 wherein the R'' variables of unit (I) are ethylene.

References Cited by the Examiner

UNITED STATES PATENTS

| | | | |
|---|---|---|---|
| 2,749,329 | 6/1956 | Ludlow | 260—873 |
| 2,789,968 | 4/1957 | Reynolds et al. | 260—873 |
| 3,021,310 | 2/1962 | Cox et al. | 260—873 |
| 3,046,255 | 7/1962 | Strain et al. | 260—77.5 |
| 3,117,018 | 1/1964 | Strauss | 260—873 |
| 3,141,863 | 7/1964 | Holm | 260—77.5 |

OTHER REFERENCES

Sarel et al.: "Journal American Chem. Society," vol. 80 (1958), (pp. 4596–9 relied on).

MURRAY TILLMAN, *Primary Examiner.*

J. T. GOOKASIAN, *Assistant Examiner.*